July 14, 1942. G. F. BAHR 2,290,011
FAN
Filed May 17, 1939
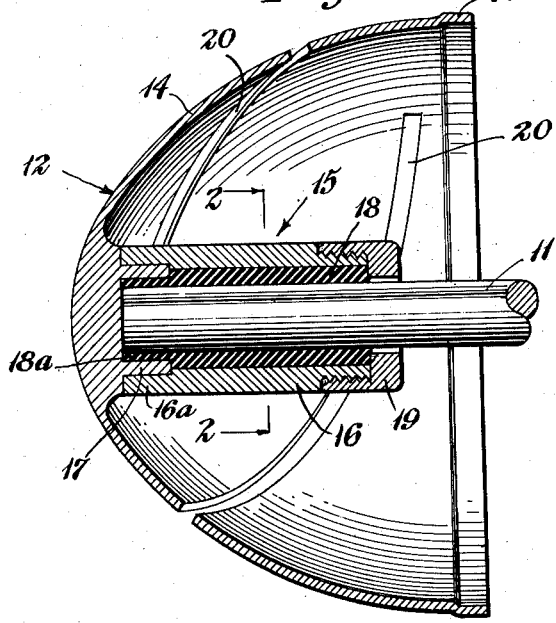
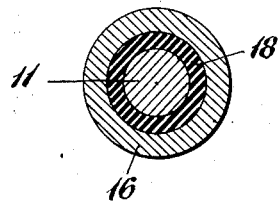
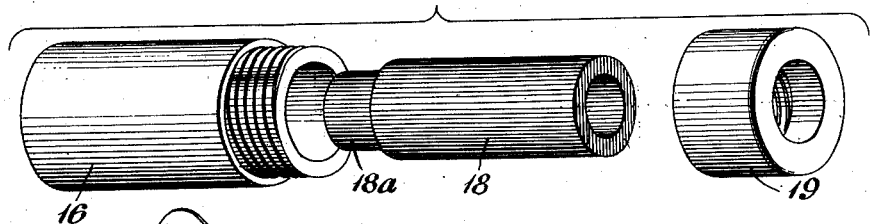
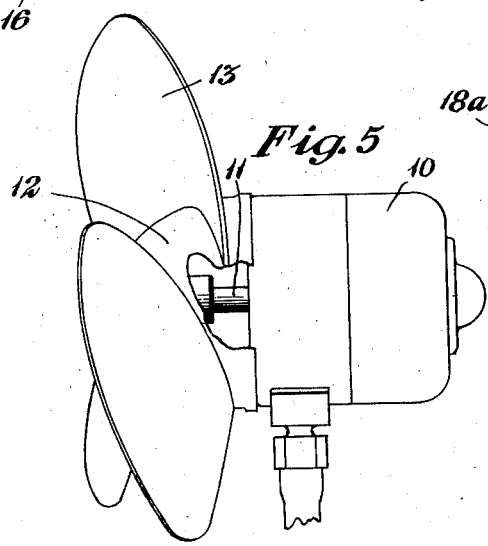
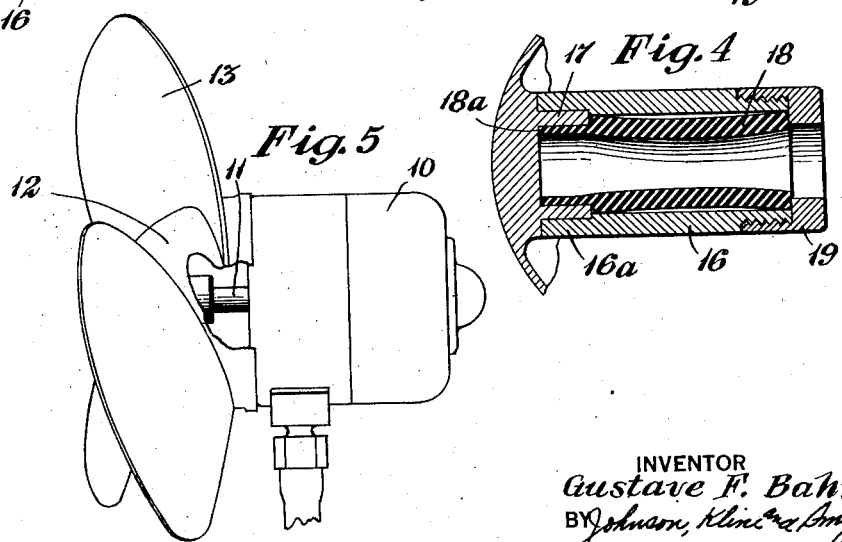
INVENTOR
Gustave F. Bahr
BY Johnson, Klinse Smyth
ATTORNEYS Patented July 14, 1942

2,290,011

UNITED STATES PATENT OFFICE 2,290,011

FAN

Gustave F. Bahr, Bridgeport, Conn., assignor to Casco Products Corporation, Bridgeport, Conn., a corporation of Connecticut Application May 17, 1939, Serial No. 274,111

9 Claims. (Cl. 170—173)

The present invention relates to fans, and, more particularly, to the means for mounting the hub of the fan on the drive shaft.

In prior constructions, the hub of the fan is mounted on the drive shaft by locking means which are adjusted after the hub has been put in place. These locking means have taken the form of bolts threaded into the shaft, lock nuts or set screws which are tightened up after the hub has been put in place and usually require the hub to be provided with apertures and the like formations through which the operating means or adjusting means for the set screws or other locking means can be inserted and operated.

An object of the present invention is to provide a mounting which will securely hold the hub in place on the shaft without requiring further operations to lock it in place. This is accomplished, according to the present invention, by providing the hub with a resilient sleeve which will receive and grip the drive shaft with sufficient friction to cause the hub and the blades carried thereby to be driven by the motor or other means for rotating the shaft.

In the preferred form of the invention, the hub is hollow and has a tubular member projecting from the inner surface thereof so as to extend axially of the hub. The tubular member can be carried entirely within the hollow hub or can project from one end thereof and has an open end through which a sleeve of resilient material, such as live rubber, is inserted and secured. The sleeve of resilient material is provided with a bore to receive and grip the end of the drive shaft.

If it is desirable to make the grip on the drive shaft adjustable, the sleeve of resilient material can be compressed, for example, by being made so as to project slightly beyond the free end of the tubular member, and a lock and clamping cap having an aperture to receive the drive shaft is threaded on the end of the tubular member and into engagement with the projecting end of the sleeve.

Upon tightening of the cap, the resilient sleeve will be compressed so as to reduce the bore therein and move the portion of the sleeve to more firmly grip the surface of the shaft.

In mounting the hub on the shaft, the sleeve of live rubber is located within the tubular member and the nut tightened up to lock the sleeve in place. The bore of the sleeve may be slightly smaller than the shaft, or the sleeve can be compressed so that it becomes such, and, upon the shaft being inserted into the bore, the sleeve will be compressed radially against the tubular member and apply a gripping action to the shaft.

The shaft may be suitably roughened or the sleeve provided with a suitable friction surface or the shaft can be roughened and the sleeve provided with a suitable friction surface to further aid in the driving relation between these elements.

With this construction, it is merely necessary to force the hub on the end of the shaft and the resilient gripping action of the sleeve will automatically securely hold the hub in place without any further adjustments.

A further feature of this invention resides in the fact that all of the elements of the connector are symmetrically positioned about the axis of the hub so that they do not in any way unbalance the hub as would be the case if set screws or the like were used.

Also, if in manufacturing the hub it should be slightly out of balance, the resiliency of the sleeve will permit the hub to assume a true balance on the shaft when the latter is rotated.

Other features and advantages of the invention will be apparent from the specification when considered in connection with the drawing, in which:

Figure 1 is a longitudinal sectional view of the hub.

Fig. 2 is a sectional view, taken along line 2—2 of Fig. 1.

Fig. 3 is an exploded view of the tubular member sleeve and locking member.

Fig. 4 is a fragmentary longitudinal sectional view of the hub, showing the relation of the connecting means when the sleeve is under compression and before the drive shaft is inserted.

Fig. 5 shows an electric fan, with part of the hub broken away, showing the connection of the present invention.

In the illustrated form of the invention, a driving motor 10 has a drive shaft 11 projecting therefrom and on which the hub 12 having a plurality of radially projecting fan blades 13 is mounted. Upon rotation of the motor, the fan blades will be driven and cause a stream of air to be created.

The present invention provides a novel means wherein the hub can be secured to the drive shaft for rotation therewith without requiring any operations or adjustments to be made after the hub is in place. In the illustrated form of the invention, the hub 12 comprises a hollow shell 14 having a tubular member 15 within the hub projecting axially thereof. This tubular member preferably lies within the trailing edge of the hub. This edge of the hub is provided with a flange 14a overlapping the front of the motor, as shown in Fig. 5, so that the member is completely enclosed by the hub.

If desired, the member can be formed integrally with the hub, or it can be formed as a sleeve 16 having a portion 16a overlapping and secured to an annular member 17 projecting inwardly from the nose of the hub.

Disposed within the tubular member is a sleeve 18 of resilient material having a bore to receive the end of the drive shaft and form the drive connection therewith. The sleeve is illustrated as having a reduced neck 18a which extends into the member 17. In the present preferred form of the invention, the sleeve 18 is made up of live rubber, though the same may be made of any resilient material which can be compressed sufficiently to apply a gripping force to the end of the drive shaft.

In order to increase the grip of the sleeve 18 on the shaft or to adapt it to receive shafts of slightly smaller diameter, the present invention forms the resilient sleeve so that it extends slightly beyond the free end of the tubular member and is placed under compression by means of a cap 19 threaded on the free end of the tubular member and engaging the end of the sleeve to place it in a state of compression as shown in Fig. 4. By properly adjusting the cap, it will be understood that various degrees of compression can be had in the sleeve, and, consequently, various amounts of gripping action will take place between the friction sleeve and the drive shaft.

It will be further appreciated that by compressing the sleeve and reducing the bore therein, proper driving connection can be had with drive shafts having slightly smaller diameters.

If desired, the engaging surfaces of the resilient sleeve or drive shaft or both can be provided with friction surfaces to resist rotation between these elements.

When a fan hub is to be assembled, the blades are inserted in the slots 20 so that they project radially therefrom. The resilient sleeve 18 is located in the tubular member 16 and the cap 19 is then threaded on the end of the member to lock the sleeve in position and place it under compression, the amount of compression depending upon the size of the shaft to be inserted therein and the pressure of the grip necessary thereon to prevent relative rotation between the hub and shaft.

As will be seen, all of the elements of the assembled coupling means will be symmetrically disposed about the axis of the hub which coincides with the axis of rotation of the fan so that objectionable vibrations, due to an unbalanced condition which might be present when set screws or the like are used as securing means, will not occur.

Further, should any slight unbalance be present in the hub as a result of the manufacturing operation, the resiliency of the sleeve will permit the hub to properly center itself on the shaft in balanced condition upon rotation of the shaft.

When a hub has thus been completed, it is assembled with the motor by inserting the motor shaft into the resilient sleeve and forcing it therein, as shown in Fig. 1. This will cause the resilient sleeve to be forced against the inner surfaces of the tubular member and be compressed, the resiliency of the sleeve will then cause the sleeve to grip the end of the shaft with sufficient pressure to hold the hub and the blades carried thereby in driving relation with the drive shaft. No further adjustments or manipulations are required, the assembling operation being complete upon the insertion of the shaft into the resilient sleeve.

Thus, the present invention eliminates the necessity of tightening set screws or other locking means after the hub has been placed on the shaft.

This is an important feature, when, as in the present type of fan, the securing means is entirely within the shell, forming the hub which is provided with a flange 14a that overlaps the end of the motor casing, as shown in Fig. 5, making it extremely difficult to provide any means for locking the hub in place after it has been located on the drive shaft.

Variations and modifications may be made within the scope of this invention and portions of the improvements may be used without others.

I claim:

1. In a fan having a propeller mounted on the end of a shaft which constitutes the sole support for said propeller, means for removably mounting the hub of the propeller solely by friction on the end of the drive shaft, comprising a rigid tubular member secured to said hub and coaxial therewith; a sleeve of resilient material disposed within said tubular member and adapted to receive the end of said drive shaft telescopically within its bore; fixed support means carried at one end of said tubular member and abutting one end of said resilient sleeve; and movable clamping means carried by the opposite end of said tubular member adapted to engage the other end of said resilient sleeve for compressing it axially within said tubular member, said axial compression bringing said sleeve into radial gripping relation with the drive shaft, said resilient sleeve constituting the sole driving connection between said shaft and said propeller.

2. In a fan having a propeller mounted on the end of a shaft which constitutes the sole support for said propeller, means for removably mounting the hub of the propeller solely by friction on the end of the drive shaft, comprisng a rigid tubular member secured to said hub and coaxial therewith; a sleeve of resilient material disposed within said tubular member and adapted to receive the end of said drive shaft telescopically within its bore; fixed support means carried at the front end of said tubular member and abutting the front end of said resilient sleeve; and means threaded to the rear end of said tubular member adapted to engage the rear end of said resilient sleeve for compressing it axially within said tubular member, said axial compression bringing said sleeve into radial gripping relation with the drive shaft and said resilient sleeve constituting the sole driving connection between said shaft and said propeller.

3. In a fan having a propeller mounted on the end of a shaft which constitutes the front support for said propeller, means for removably mounting the hub of the propeller solely by friction on the end of the drive shaft comprising a rigid tubular extension projecting coaxially from the rear surface of the hub, the latter extending over and closing the forward end of said extension; a sleeve of resilient material disposed within said tubular extension adapted to receive the end of said drive shaft telescopically within its bore, and having one end abutting the hub at the forward end of said tubular extension; and movable clamping means carried by the rear end of said tubular extension adapted to engage the rear end of said resilient sleeve for axial compression thereof to bring the sleeve into gripping relation with the drive shaft, said resilient sleeve constituting the sole driving connection between said shaft and said propeller.

4. In a fan having a propeller mounted on the end of a shaft which constitutes the sole support for said propeller, means for removably mounting the hub of the propeller solely by friction on the end of the drive shaft, comprising a rigid tubular extension projecting coaxially from the rear surface of the hub, the latter extending over and closing the forward end of said extension; a sleeve of resilient material disposed within said tubular extension adapted to receive the end of said drive shaft telescopically within its bore, and having one end abutting the hub at the forward end of said tubular extension, the rear end of said resilient sleeve normally projecting slightly beyond the rear end of said tubular extension; and movable clamping means carried by the said tubular extension at its rear end for engaging the normally projecting end of said resilient sleeve and compressing it axially into said tubular extension for bringing said sleeve into radial gripping relation with said shaft, said resilient sleeve constituting the sole driving connection between said shaft and said propeller.

5. In a fan having a propeller mounted on the end of a shaft which constitutes the sole support for said propeller, means for removably mounting the hub of the propeller solely by friction on the end of the drive shaft, comprising a rigid tubular extension projecting coaxially from the rear surface of the hub, the latter extending over and closing the forward end of said extension; a sleeve of live rubber disposed within said tubular extension adapted to receive the end of said drive shaft telescopically within its bore and having one end abutting the hub at the forward end of the tubular extension, the rear end of said live rubber sleeve normally projecting slightly beyond the rear end of said tubular extension; and a cap threaded to the rear end of the said extension, said cap having an annular flange for engaging the projecting end of said resilient sleeve and adapted to compress it axially upon threading the cap over the tubular extension, said axial compression bringing the rubber sleeve into lateral gripping relation with said driving shaft, the rubber sleeve constituting the sole driving connection between said propeller and said shaft.

6. In a fan propeller having a hollow cup-shaped hub of rigid material with a plurality of blades projecting radially therefrom, means for removably mounting said propeller solely by friction on the end of a drive shaft, comprising a rigid tubular member projecting coaxially from the inner surface of said hub and completely within the hollow of the latter, said member being closed at the end forming a junction with the hub; a sleeve of live rubber adapted to receive the end of said drive shaft telescopically within its bore disposed within said tubular member and abutting the closed end thereof; and movable clamping means carried by the open end of said tubular member for engaging the end of said live rubber sleeve to compress it axially, whereby said sleeve is brought into lateral gripping relation with said drive shaft, said sleeve constituting the sole driving connection between said propeller and shaft.

7. In a fan propeller having a hollow cup-shaped hub of rigid material with a plurality of blades projecting radially therefrom, means for removably mounting said propeller solely by friction on the end of a drive shaft, comprising a rigid tubular member projecting coaxially from the inner surface of said hub and completely within the hollow of the latter, said member being closed at the end forming a junction with the hub; a sleeve of live rubber adapted to receive the end of said drive shaft telescopically within its bore disposed within said tubular member and abutting the closed end thereof; and means threaded over the end of said tubular member and movable into engagement with the end of said rubber sleeve for axial compression thereof, whereby said sleeve is brought into lateral gripping relation with said drive shaft, said rubber sleeve constituting the sole driving connection between said propeller and said shaft.

8. In a fan propeller having a hollow cup-shaped hub of rigid material with a plurality of blades projecting radially therefrom, means for removably mounting said propeller solely by friction on the end of a drive shaft, comprising a rigid tubular member projecting coaxially from the inner surface of said hub and completely within the hollow of the latter, said member being closed at the end forming a junction with the hub; a sleeve of live rubber adapted to receive the end of said drive shaft telescopically within its bore disposed within said tubular member and abutting the closed end thereof, the rear end of said sleeve extending slightly beyond the opposite end of said tubular member; and a cap threaded to the rear end of said tubular member, said cap having an annular flange for engaging the projecting end of said rubber sleeve to compress it axially into said tubular member, axial compression of the sleeve bringing it into lateral gripping relation with said drive shaft, said rubber sleeve constituting the sole driving connection between said shaft and said propeller.

9. A fan comprising a propeller having a hollow cup-shaped hub of rigid material and a plurality of blades projecting radially therefrom; a motor having a casing and a drive shaft projecting therefrom; means for removably mounting said fan propeller on the end of said drive shaft with the edges of said hub extending substantially to the casing of the motor to form an apparently continuous surface, said means comprising a rigid tubular member projecting coaxially from the inner surface of said hub and completely within the hollow thereof, said member being closed at its forward end which forms its junction with the hub; a sleeve of live rubber adapted to receive the end of said drive shaft telescopically within its bore disposed within said tubular member and abutting the closed end thereof; and movable clamping means carried by the rear end of said tubular member for engaging the end of said live rubber sleeve to compress the latter axially, whereby said sleeve is brought into lateral gripping relation with said drive shaft, said rubber constituting the sole driving connection between said shaft and said propeller.

GUSTAVE F. BAHR.